3,434,950
PROCESS FOR PRODUCING METAL OXIDE PARTICLES OF REDUCED PARTICLE SIZE

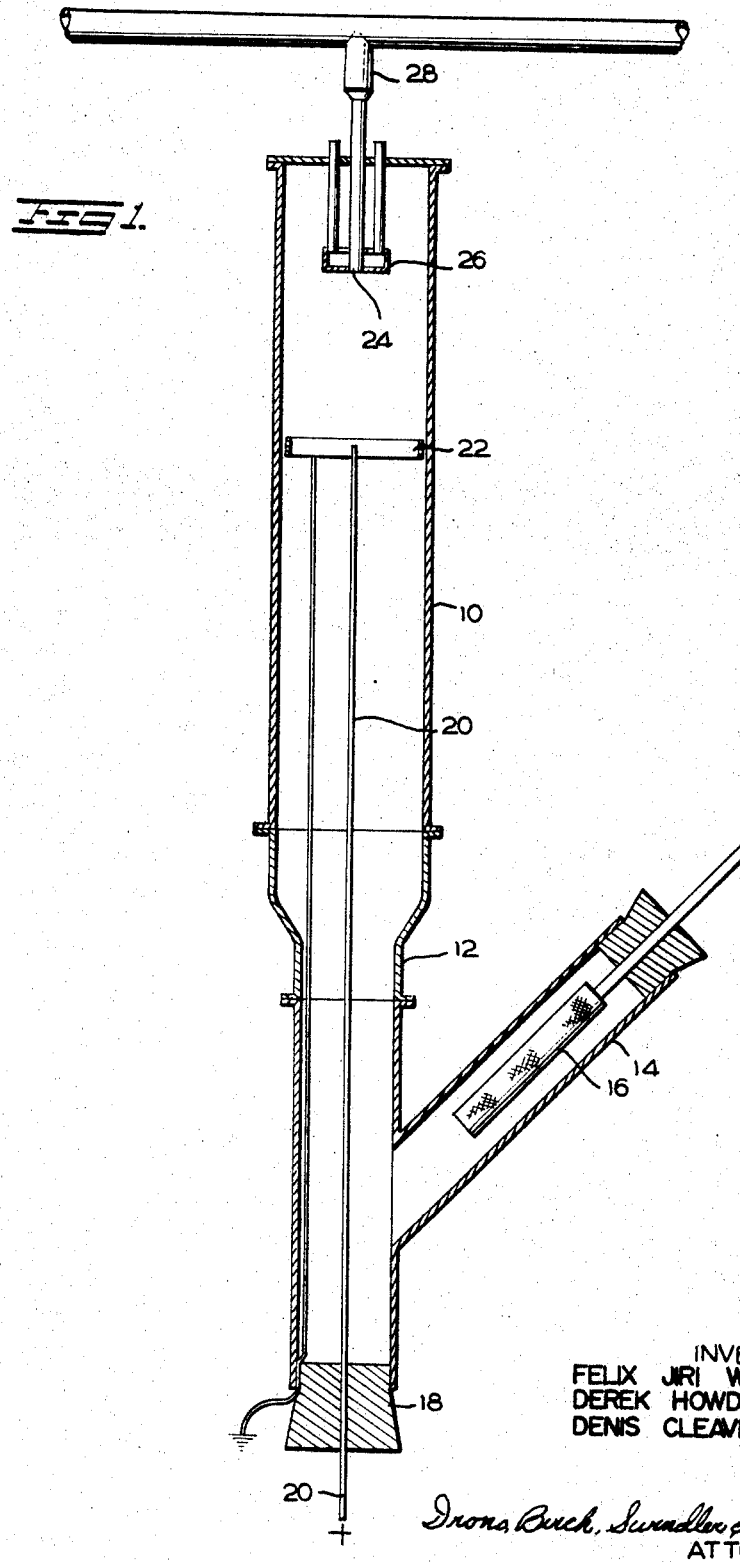

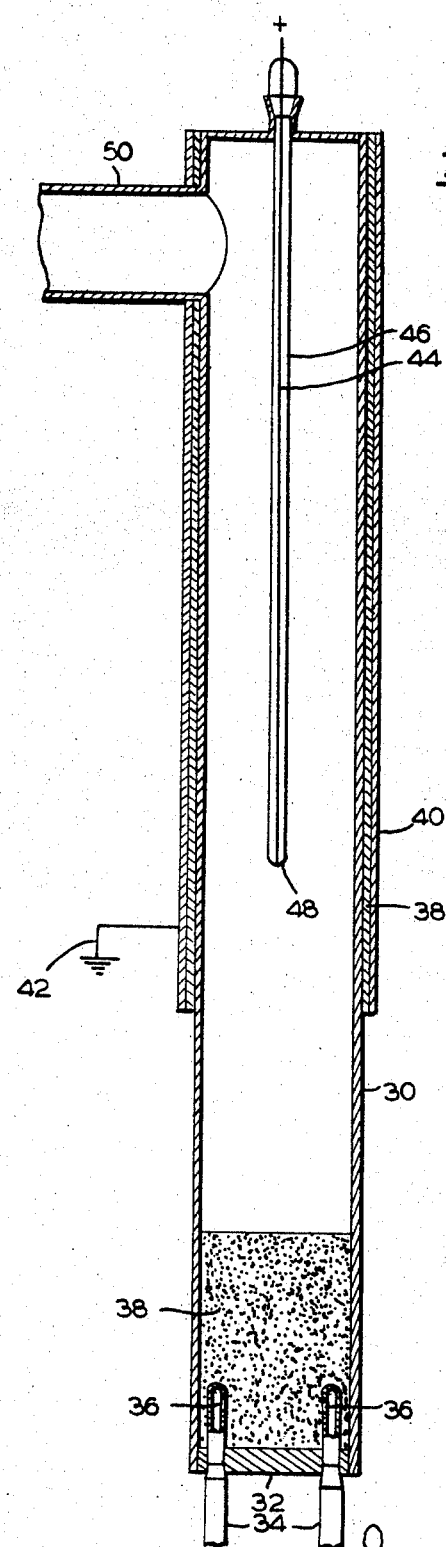

Felix Jiri Weinberg, London, Derek Howden, Nunthorpe, Middlesbrough, and Denis Cleaver, Saltburn, England, assignors to British Titan Products Company Limited, Billingham, Durham, England, a corporation of the United Kingdom
Filed Oct. 12, 1965, Ser. No. 495,325
Claims priority, application Great Britain, Oct. 22, 1964, 43,113/64
Int. Cl. B01k 1/00
U.S. Cl. 204—164                     12 Claims

ABSTRACT OF THE DISCLOSURE

Metal oxide particles suitable for use as nucleation particles in the production of pigments or as pigments themselves may be prepared by effecting reaction between the corresponding metal halide and an oxygenating gas in an electric field produced by electrodes maintained at different electrical potentials which electrodes are positioned to preclude substantial electrical discharge therebetween.

---

The present invention relates to a process for the production of inorganic particles of controlled size.

It is normally important, when producing pigments and other fine materials, to control the size of the particles formed. For example, the usual mean weight particle size of metal oxides, such as titanium dioxide, when used for pigmentary purposes, is in the range of about 0.2 to 0.3 micron and particularly in the range 0.2 to 0.25 micron.

It is, however, frequently of value to produce metal oxides of smaller mean weight particle size than this, for example having a mean weight particle size below about 0.2 micron and particularly below about 0.17 or even 0.15 micron. Such particles are of particular value as nuclei in the production of larger particles of metal oxide of uniform particle size by growth reaction.

One process in which metal oxide particles of small particle size are of great value is that described in copending U.S. patent application No. 254,007 of Arkless and Groves, now abandoned, wherein small particles of metal oxide, for example titanium dioxide, are introduced in a dispersed state into a reaction chamber in which a metal halide, for example a titanium tetrahalide, is being oxidised in the vapour phase to the corresponding metal oxide. It appears that the small particles of metal oxide introduced into the reaction chamber act as nuclei upon which metal oxide is formed in the reaction zone, thus giving particles of a very uniform size. In such a process, it is not essential that the small initial particles of metal oxide, i.e. the nuclei, should be the same oxide as that produced in their presence in the reaction chamber although it is preferred that they are composed of the same material.

A further use for particles of metal oxide, particularly titanium dioxide, having a mean weight crystal size below about 0.2 micron is as pigmentary material where high brightness at low pigment volume concentrations are required, for example in the pigmentation of floor coverings such as linoleum and plastic tiles.

In view of the foregoing, it will be appreciated that methods for the production of metal oxide or other substances of small mean weight particle size are of value and it is an object of the present invention to provide a process which is particularly suitable for the production of such material.

Accordingly, the present invention is a process which comprises forming metal oxide particles by the vapour phase oxidation of metal halide in a reactor in the presence of an electric field formed between at least two electrodes maintained at different electric potentials.

Examples of the metal oxides of the invention are titanium dioxide and silicon dioxide. The invention is particularly useful for controlling the particle size of pigments, and the metal oxides just mentioned are examples of such pigments.

The term "oxidation" as used in this specification includes the conversion of the metal halide to the oxide by hydrolysis, for example by steam, wherein the halogen of the metal halide is removed as hydrogen halide, as well as the conversion by straight oxygenation, in which the halide is oxidised to free halogen and the corresponding metal oxide.

It is preferred, however, to carry out the process by oxidising the metal halide with oxygen or an oxygen-containing gas mixture, such as air, to form free halogen and the corresponding metal oxide since the free halogen is more readily utilized in the production of more metal halide than is the hydrogen halide.

The preferred metal oxide particles are white, and the preferred metal halides are the metal chlorides (particularly the tetrachlorides of titanium, zirconium and silicon and the trichloride of aluminium), which give rise to white metal oxides when oxidised (i.e. particularly titanium dioxide, zirconium dioxide, silicon dioxide and aluminium oxide, respectively). The process may, however, also be applicable to the production of coloured metal oxides, for example to the oxidation of an iron halide (such as ferric chloride) to ferric oxide.

The reaction may be carried out in a reactor which comprises a substantially empty chamber into which, for example, the reactants are introduced through a burner or it may be carried out in a reactor containing a bed of particulate solids (which retain some of the heat of reaction) and fluidised by a gas, for example, one or more gaseous reactants, introduced through the bed.

It is preferred to carry out the present process in a reactor comprising a substantially empty chamber into which the reactants are introduced through a burner.

In an oxidising process, in addition to the metal halide and oxidising gas, other compounds may be introduced into the reactor, for example, minor proportions of other metal halides, particularly the chlorides. Examples, (particularly when the main metal halide is titanium tetrachloride) are silicon tetrachloride, zirconium tetrachloride and aluminium trichloride. Other compounds which may be introduced include water (to modify the physical properties of the metal oxide produced), and a fuel gas (for example hydrogen, carbon monoxide or a gaseous hydrocarbon such as propane), to maintain the necessary temperature in the reaction zone. A temperature in the range of 800° to 1600° C. and preferably one in the range 900° to 1400° C. is a particularly suitable one to maintain in the reactor for the oxidation of titanium tetrahalides.

The electrodes at different potentials are preferably placed in the reactor in such a position that no substantial electrical discharge occurs between them, at least when the reaction is not taking place. For example, one electrode may be in the form of an electrically conducting plate or ring either inside or outside the wall of the reactor (the wall of which is normally electrically non-conducting) and the other electrode may be placed centrally in the reactor.

Alternatively, the electrodes to be maintained at different potentials may be placed at different levels in the reactor, for example they may be in the form of two or more rings or plates on the interior or exterior surface of the wall of the reactor at different distances from the reactant inlet orifice(s).

In one preferred embodiment of the invention, the electrodes are placed within the reactor at positions which are downstream from the reactant inlets. If desired, the reactant inlet orifice(s), if made of electrically conducting material, may form an electrode.

Where a fluidised bed is present in the reactor, an electrode(s) may be placed within the bed and the other electrode(s) outside the bed, for example it may be placed centrally in the reactor above the bed.

The difference in electrical potential between the electrodes in order to produce metal oxide particles of smaller size than that produced in the absence of such a potential will depend upon the distance apart of the electrodes which are to be maintained at the different potentials. Generally, however, it is preferred to maintain the electrode at such a potential difference as to provide a field strength between the electrodes of at least $6 \times 10^3$ volts/metre and particularly one of at least $10^4$ volts/metre.

The heat produced in the reactor by the passage, if any, of current between the electrodes at different electric potentials is generally less than 1% and particularly less than 0.5% of the heat liberated in the reactor by any chemical reaction or reactions taking place therein.

It appears that small metal oxide particles can be obtained irrespective of which of the electrodes is earthed and of the relative polarity of these electrodes.

Some difference in the behaviour of the metal oxide particles in the reactor during the process of the present invention may occur depending upon which electrode is earthed. For example, where peripheral and central electrodes were used and the peripheral electrode was earthed, a potential on the central electrode of ±10 kilovolts appeared to favour precipitation of the particles upon the wall and such particles tended to be restricted to the space between the peripheral electrode and their zone of formation.

When the voltage was applied to the peripheral electrode and the central electrode was earthed, however, the particles appeared to be less restricted in movement and they tended to move more slowly away from their zone of formation along the reactor.

In both cases, the particles were of smaller size when a substantial potential difference existed between the electrodes than when there was no such difference in potential.

It is believed (although it is not intended that we should be limited in any way by this theory) that the electric field produced by the electrodes exerts a force upon the electrically charged titanium dioxide particles which accelerates their removal from the reaction zone and thus limits their growth. The particle may acquire their electrical charges in various ways, which may or may not be assisted by the presence of the electric field, for example: by emission of electrons either thermally or under the influence of exciting radiations such as ultra-violet light, X-rays, or γ rays (which may be directed on to the particles in the reactor for this purpose); by capture of gaseous ions produced in the reaction; or by capture of gaseous ions produced when the electric field is sufficiently intense for corona breakdown to occur at one electrode.

The following examples describe various embodiments of the present invention.

EXAMPLE I

A reactor (FIG. 1) was set up comprising the upper portion 10 consisting of a Pyrex tube of 6" internal diameter and 24" in length. To this was connected a lower portion 12, 22" long, which narrowed from 6" to 4" internal diameter.

In the wall of the lower portion was a side arm 14 through which gaseous products could be withdrawn from the reactor through a cloth filter 16 (which retained the particles of metal oxide).

Through the sealed bottom 18 of the reactor passed a centrally disposed electrode 20 composed of a nickel/chromium wire. The electrode is unconnected to a suitable source of electrical potential (not shown).

The other electrode 22 consisted of a nickel/chromium band around the interior of the upper portion of the reactor at approximately the same level as the upper end of the central electrode. In the embodiment shown in FIG. 1, electrode 22 is grounded at point 23.

Approximately 6" above the electrodes and centrally disposed in the end of the upper portion of the reactor was the exit orifice 24 of a burner 26 to which could be supplied a premixed and preheated mixture of titanium tetrachloride, oxygen and carbon monoxide.

In order to carry out the process, substantially premixed dry carbon monoxide and oxygen were heated to 300° C. and passed into the burner through a mixing chamber 28. The mixture was then ignited and when the flame was established, premixed titanium tetrachloride and oxygen were preheated to 300° C. and passed to the mixing chamber.

The rates of flow of the gases were:

| | Litres/min. |
|---|---|
| Carbon monoxide | 2 |
| Oxygen (with CO) | 1 |
| TiCl$_4$ | 0.5 |
| Oxygen (with TiCl$_4$) | 1 |

The process was carried out with various potential differences applied to the electrodes and the mean weight particles size of the resulting titanium dioxide under these conditions was measured.

The results obtained are given in Table I.

TABLE I

| Peripheral electrode | Central electrode (kilovolts) | Mean weight particle size (micron) |
|---|---|---|
| Earthed | +10 | 0.11 |
| Do | +8 | 0.13 |
| Do | +4 | 0.14 |
| Do | +2 | 0.14 |
| No applied voltage | | 0.15 |

The process was also carried out without applied voltage and the results are included in Table I.

EXAMPLE II

A process similar to that described in Example I was carried out but the central electrode was omitted and the aluminum nozzle of the burner was made the other electrode.

Various potential differences were applied to the electrodes and the mean weight particle size of the titanium dioxide produced was measured.

TABLE II

| Peripheral electrode | Burner | Mean weight particle size (micron) |
|---|---|---|
| Earthed | +10 kilovolts | 0.10 |
| Do | −10 kilovolts | 0.11 |
| −10 kilovolts | Earthed | 0.12 |
| +10 kilovolts | do | 0.12 |
| No applied voltage | | 0.15 |

EXAMPLE III

A reactor (FIG. 2) was set up consisting of a 3" internal diameter silica tube 30 which was sealed at the lower end with a silic disc 32 through which passed two tubes 34. The tubes were sealed at their upper ends but were provided with a hole 36 in the side wall 1" from the base of the reactor. Both holes were directed inwardly.

Sufficient particulate TiO$_2$ (particle size in the range 210 microns to 360 microns) was put into the reactor to form a static bed 38 6" in height.

Outside the reactor commencing about 1 foot above the base plate and covering the outside of the reactor for a height of 2 feet was a layer 38 of nickel/chrome tape. Over this was placed mild steel wire gauze 40 which was earthed 42. This formed the peripheral electrode. Down the centre of the reactor was passed a 12 gauge nickel/chromium wire 44 enclosed in a silica tube 46. This formed the central electrode.

The lower end 48 of the central electrode 46 was about 12″ above the top of the bed (when static).

The upper end of the reactor was provided with a side arm 50 through which the reaction products could be withdrawn and the lower part of the reactor was enclosed in an electric furnace (not shown).

The temperature of the lower part of the reactor was raised to 1000° C. by means of the furnace and oxygen (containing sufficient $AlCl_3$ to give 3% alumina on $TiO_2$) was introduced through one of the inlet tubes 34 in the bed at a rate of 18 litres/min. and $TiCl_4$ vapour (equivalent to 55 ml./min. liquid $TiCl_4$) was introduced through the other tube 34. (The $TiCl_4$ vapour also contained sufficient $SiCl_4$ to form 0.25% silica on $TiO_2$).

Various voltages were applied to the central electrode 44 and the mean weight crystal size of the $TiO_2$ produced was measured at each voltage.

An experiment was also carried out in which no voltage was applied.

The results obtained are given in Table III.

Table III

| Voltage applied to central electrode: | Mean weight particle size (micron) |
| --- | --- |
| 1000 (alternating current) | 0.12 |
| 900 (+ve)[1] | 0.14 |
| 600 (−ve)[1] | 0.17 |
| No voltage applied | 0.21 |

[1] With respect to earth.

What is claimed is:

1. In the production of metal oxide particles of pigmentary size and smaller by the reaction of a metal halide with an oxygenating gas in a reaction zone, the improvement which comprises effecting said reaction in an electric field having a field strength of at least $6 \times 10^3$ volts per meter, said electric field produced by at least two electrodes maintained at different electric potentials positioned to preclude substantial electrical discharge therebetween, the heat produced by said electric field comprising less than 1% of the heat liberated in said reaction zone by any chemical reaction, whereby said metal oxide particles are obtained with substantially reduced mean weight particle size when compared with the product produced by the same reaction in the absence of said electric field.

2. A process in accordance with claim 1 wherein said metal halide is titanium tetrachloride, wherein said electric field has a field strength of at least $10^4$ volts per meter, wherein the heat produced by said electric field is less than 0.5% of the heat liberated in said electric zone by any chemical reaction and wherein said metal oxide particles are obtained having a mean weight particle size below about 0.2 micron.

3. A process in accordance with claim 1 wherein said metal halide is selected from the group consisting of the halides of titanium, zirconium, silicon and aluminum.

4. A process in accordance with claim 3 wherein said metal halide is a chloride.

5. A process in accordance with claim 1 wherein said electric field has a field intensity of at least $10^4$ volts/meter and the metal halide is oxidized in the vapor phase to said metal oxide particles.

6. A process in accordance with claim 5 wherein the heat produced by the electric field is less than 0.5% of the heat liberated by chemical reaction.

7. A process in accordance with claim 1 wherein said electrodes comprise a peripheral electrode and a centrally located electrode.

8. A process in accordance with claim 7 wherein said peripheral electrode is positioned in and adjacent to the wall of a reactor confining said reaction zone.

9. A process in accordance with claim 7 wherein said peripheral electrode is positioned outside an electrically non-conducting wall of a reactor confining said reaction zone.

10. A process in accordance with claim 4 wherein said metal halide is selected from the group consisting of $TiCl_4$, $TiBr_4$ and $TiI_4$ which is reacted with oxygen in the vapor phase.

11. A process in accordance with claim 10 in which the field intensity is at least $10^4$ volts/meter.

12. A process in accordance with claim 10 in which the heat produced in said zone by the field is less than 0.5% of that liberated by chemical reaction.

References Cited

UNITED STATES PATENTS

| | | | |
| --- | --- | --- | --- |
| 3,003,939 | 10/1961 | Rouy et al. | 204—164 |
| 3,004,137 | 10/1961 | Karlovitz | 204—164 XR |
| 3,005,762 | 10/1961 | Fenn | 204—164 |
| 3,043,657 | 7/1962 | Hughes et al. | 23—202 XR |
| 3,090,745 | 5/1963 | Berghaus | 204—164 XR |
| 3,304,249 | 2/1967 | Katz | 204—164 |
| 3,304,265 | 2/1967 | Evans et al. | 23—202 XR |
| 3,324,027 | 6/1967 | Berghaus | 204—164 XR |

EDWARD STERN, *Primary Examiner.*

U.S. Cl. X.R.

23—1, 140, 142, 182, 200, 202; 106—300